United States Patent [19]

Iwama et al.

[11] Patent Number: 5,247,373
[45] Date of Patent: Sep. 21, 1993

[54] SCANNING OPTICAL SYSTEM

[75] Inventors: Masatoshi Iwama, Shizuoka; Akira Morimoto, Tokyo, both of Japan

[73] Assignee: Asahi Kogaku Kogyo Kabushiki Kaisha, Tokyo, Japan

[21] Appl. No.: 582,764

[22] Filed: Sep. 14, 1990

[30] Foreign Application Priority Data

Sep. 14, 1989 [JP] Japan .................................. 1-239151
Sep. 14, 1989 [JP] Japan .................................. 1-239152

[51] Int. Cl.$^5$ ............................................. H04N 1/04
[52] U.S. Cl. .................................. 358/471; 358/481; 358/484
[58] Field of Search ............... 358/474, 481, 484, 471, 358/494; 250/235, 236; 359/197, 204, 205, 212, 216, 217, 218, 219, 220

[56] References Cited

U.S. PATENT DOCUMENTS

| | | |
|---|---|---|
| 4,358,793 | 11/1982 | Hosaka et al. . |
| 4,447,723 | 5/1984 | Neumann ............................. 250/236 |
| 4,523,093 | 6/1985 | Neumann ............................. 250/232 |
| 4,556,903 | 12/1985 | Blitchington et al. ............... 358/481 |
| 4,578,688 | 3/1986 | Okuno ................................. 359/218 |
| 4,600,837 | 7/1986 | DiStefano et al. .................. 358/481 |
| 4,667,099 | 5/1987 | Arai et al. ........................... 250/235 |
| 4,850,686 | 7/1989 | Morimoto et al. .................. 350/484 |
| 4,853,535 | 8/1989 | Suganuma ........................... 250/235 |
| 4,858,019 | 8/1989 | Ohara et al. ........................ 358/474 |
| 4,866,464 | 9/1989 | Straayer ............................. 250/235 |
| 4,868,673 | 9/1989 | Negoro ............................... 358/296 |
| 4,918,306 | 4/1990 | Saito ................................... 250/235 |

FOREIGN PATENT DOCUMENTS 58-58685 4/1983 Japan .
60-124938 7/1985 Japan .
60-232770 11/1985 Japan .
63-93267 4/1988 Japan .

OTHER PUBLICATIONS

English Language Abstract of Japanese Publication No. 60-232770.
English Language Abstract of Japanese Publication No. 63-93267.
English Language Abstract of Japanese Publication No. 60-124938.
A paper presented at the Japan Precision Instrument Institutes spring convention in 1983 along with a partial translation.
English Language Translation of the German Office Action dated Feb. 12, 1993.

Primary Examiner—Edward L. Coles, Sr.
Assistant Examiner—Jerome Grant, II
Attorney, Agent, or Firm—Sandler, Greenblum & Bernstein

[57] ABSTRACT

A scanning optical system has a drawing light source, a rotary scanning deflector, a scanning lens and a detection device for detecting a rotational position of the scanning deflector. The drawing light source is controlled by a timing control signal generated by a timing control device as a function of drawing data. The scanning optical system may have a transmission scale, a scanning light receiving portion and a diffusion plate disposed between transmission scale and scanning light receiving portion and adapted to diffuse the monitor beam made incident to the scanning light receiving portion.

19 Claims, 11 Drawing Sheets

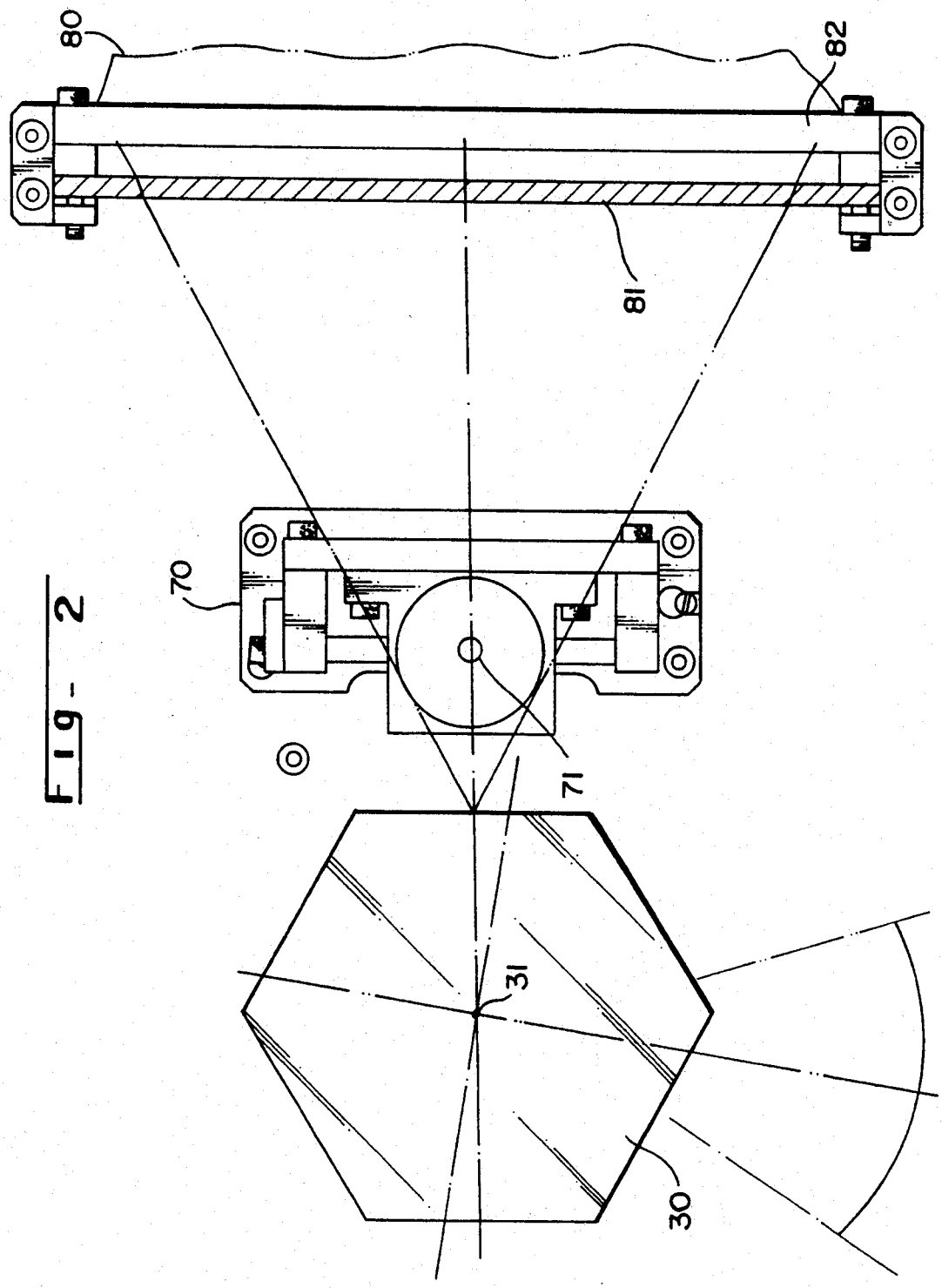

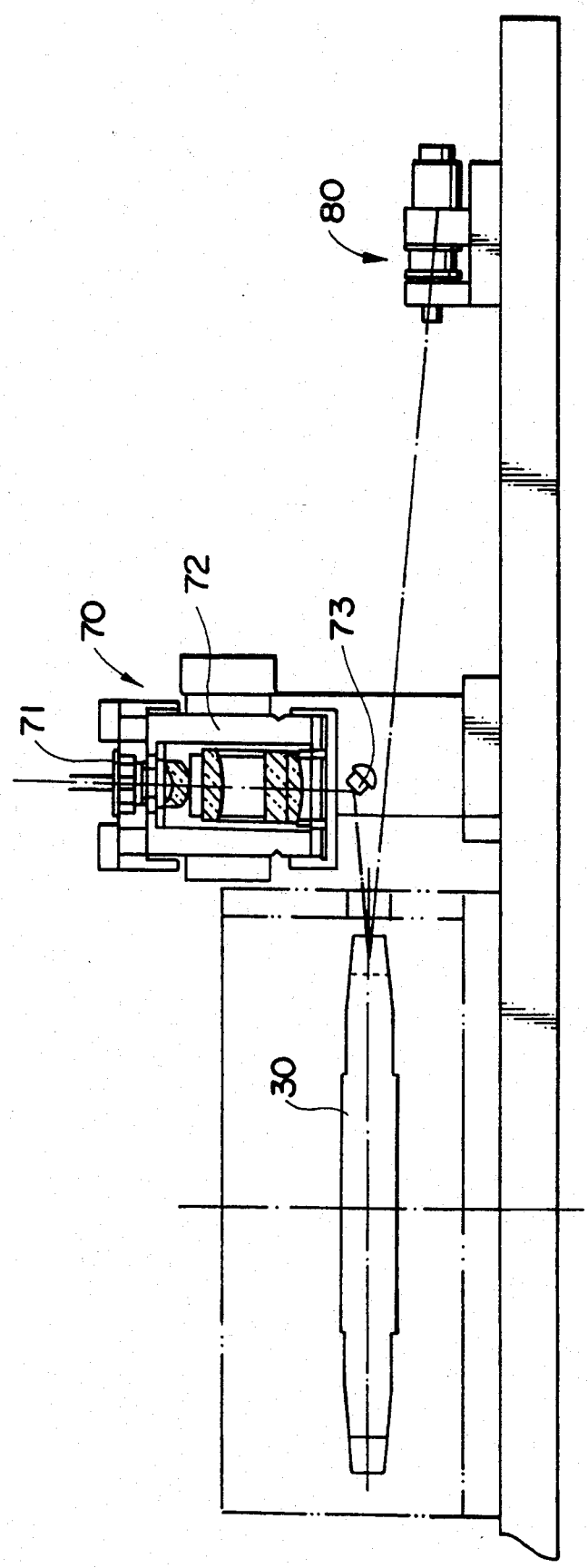

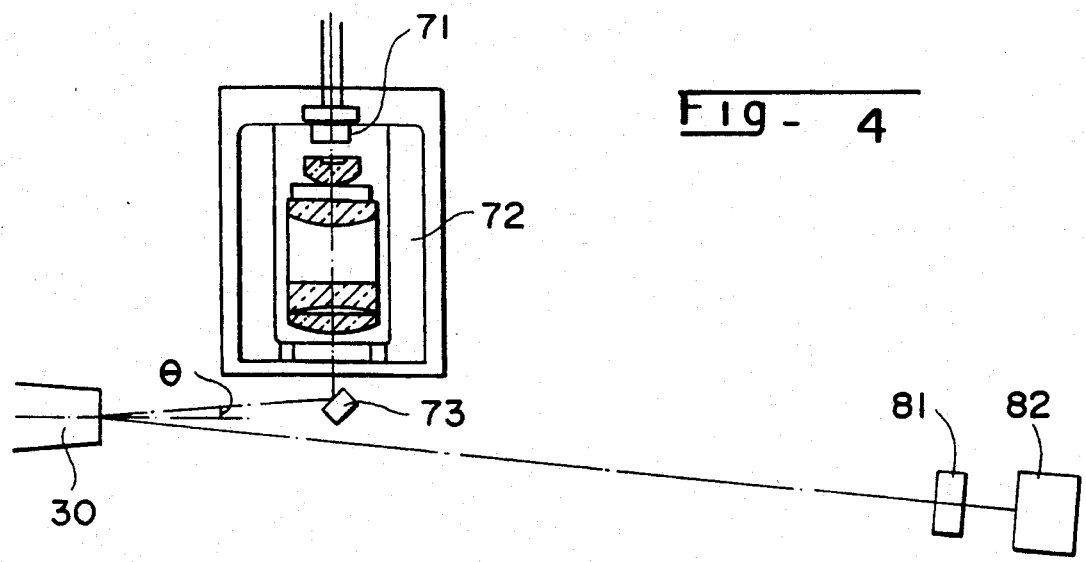
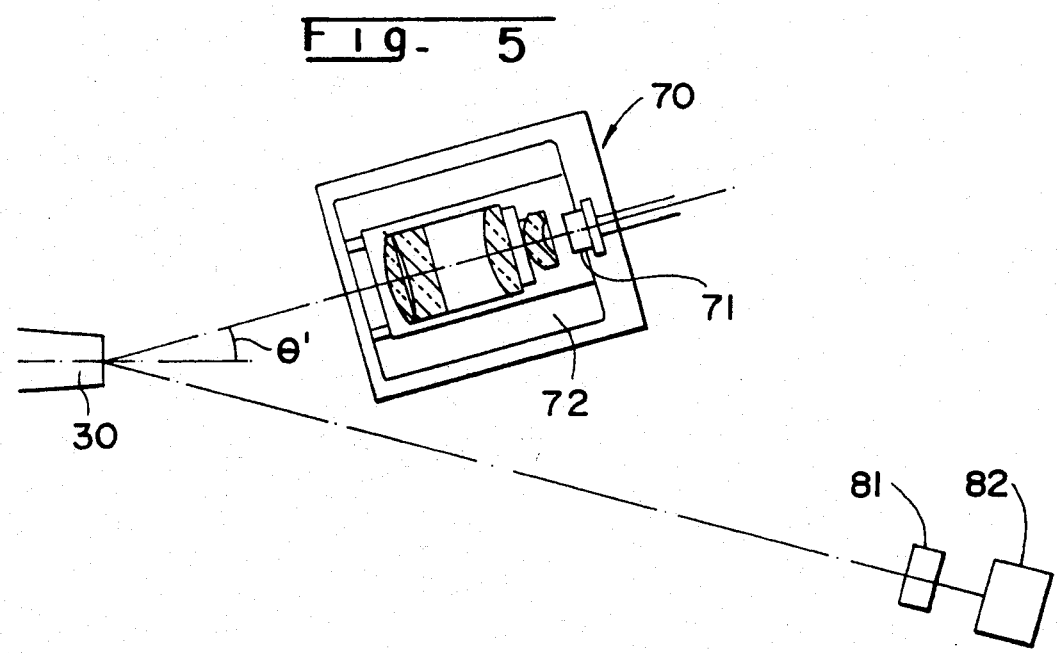

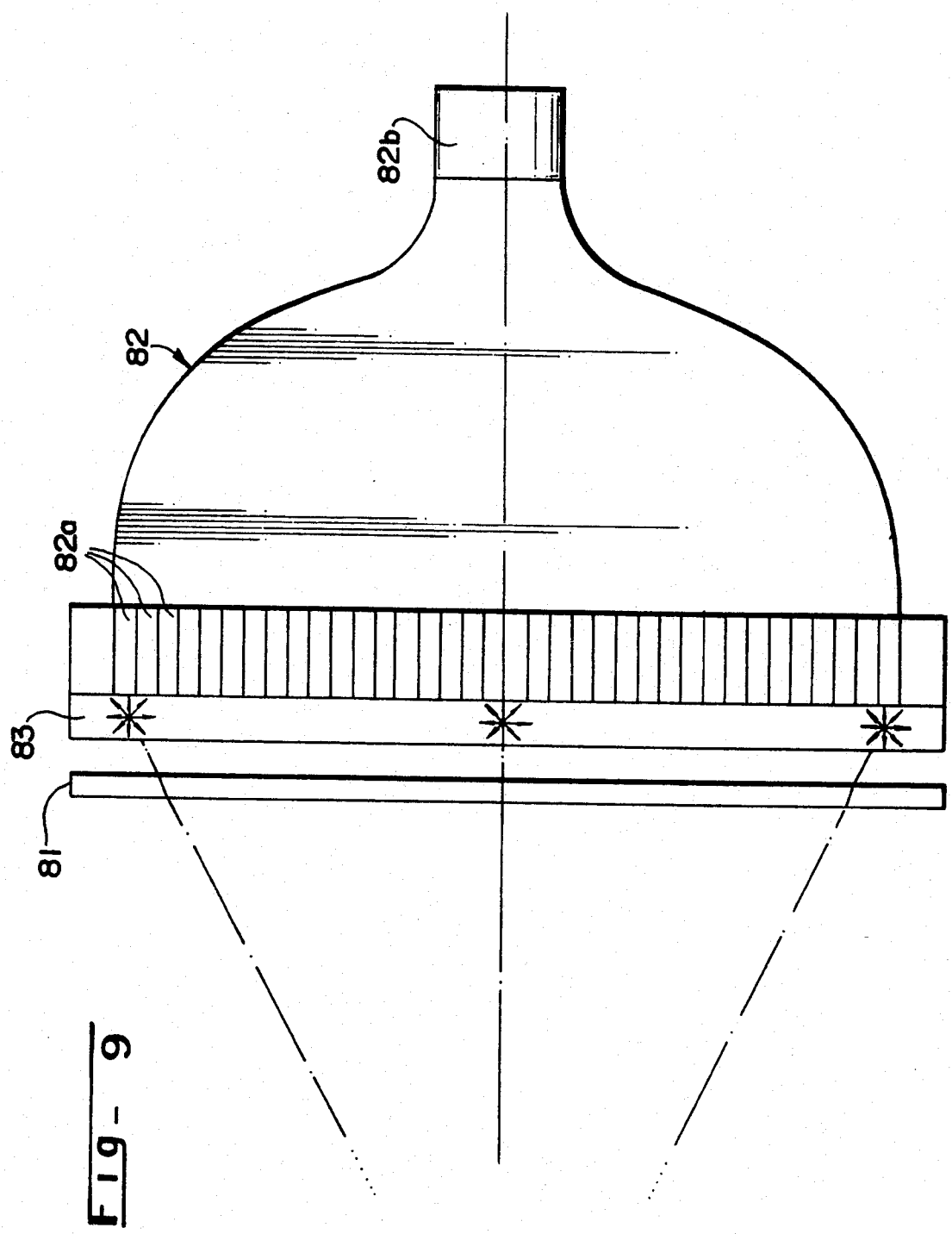

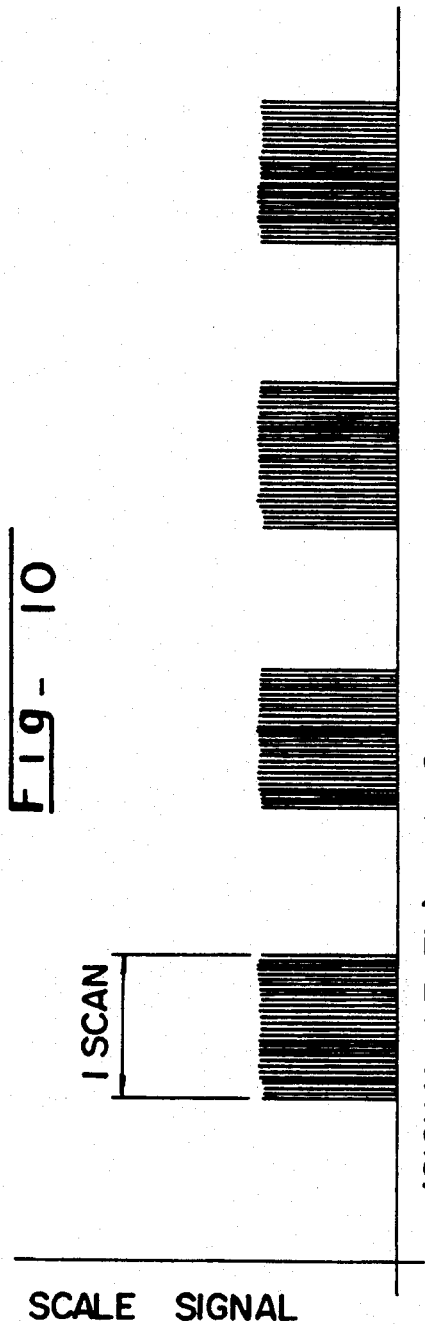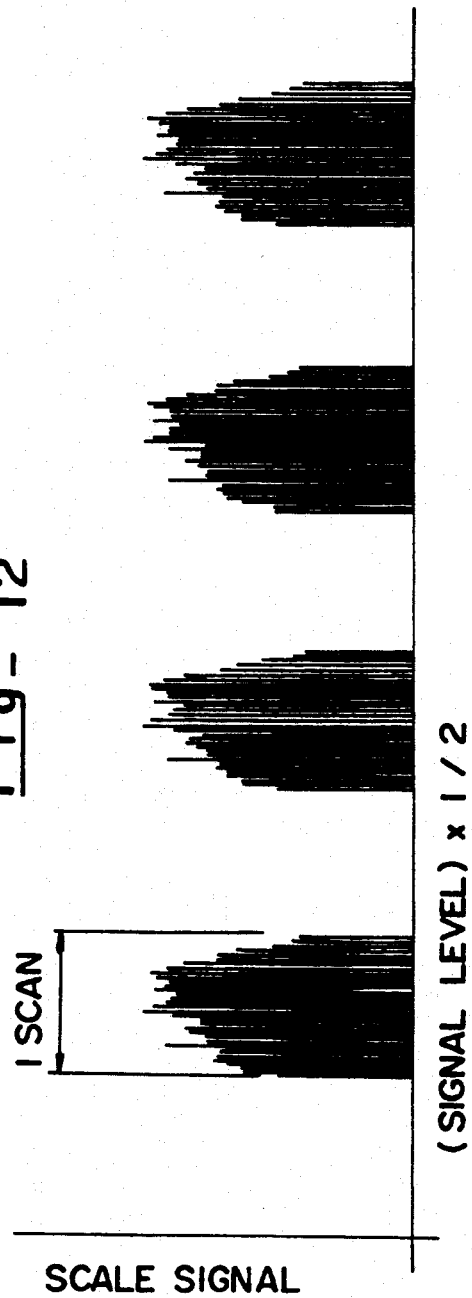

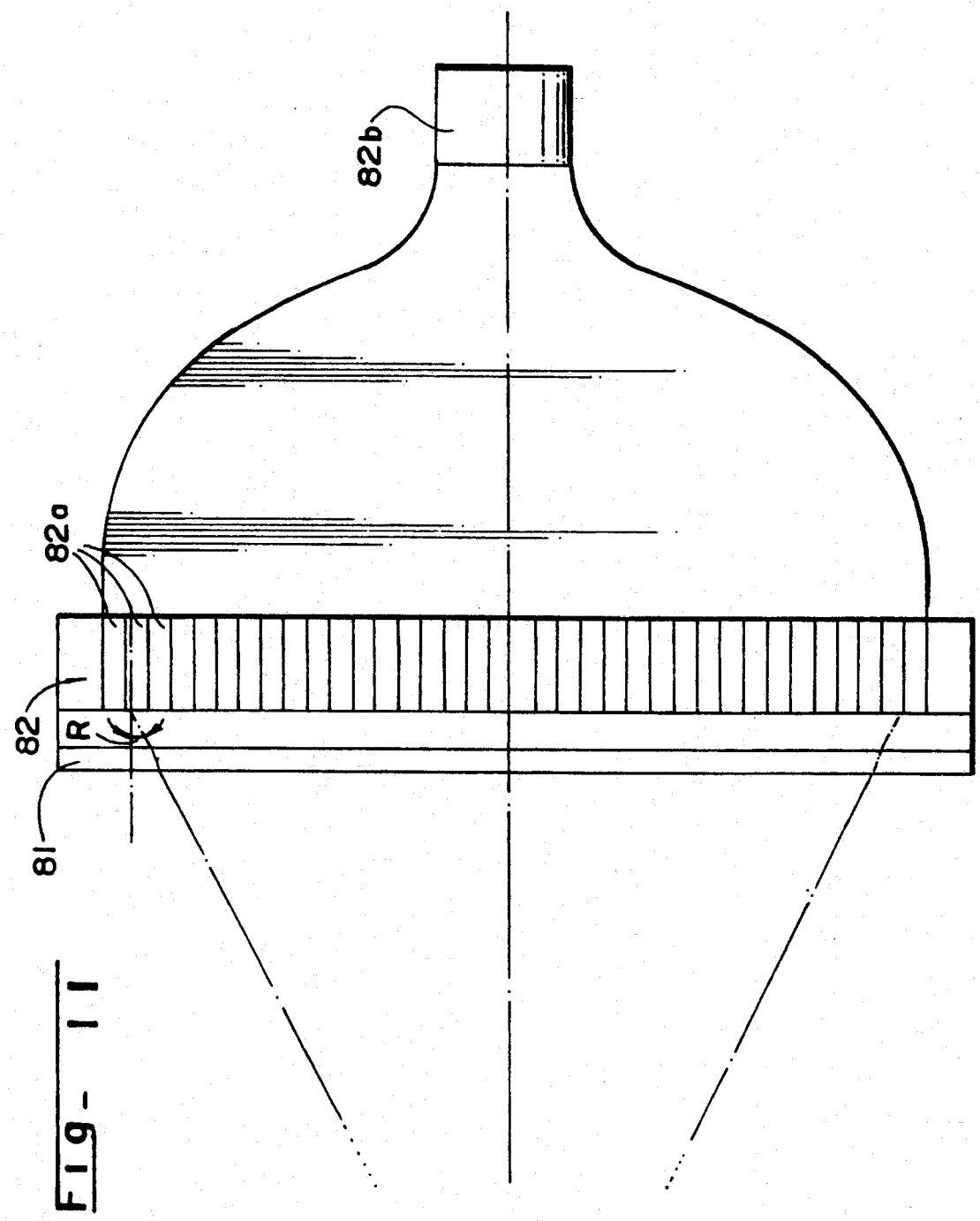

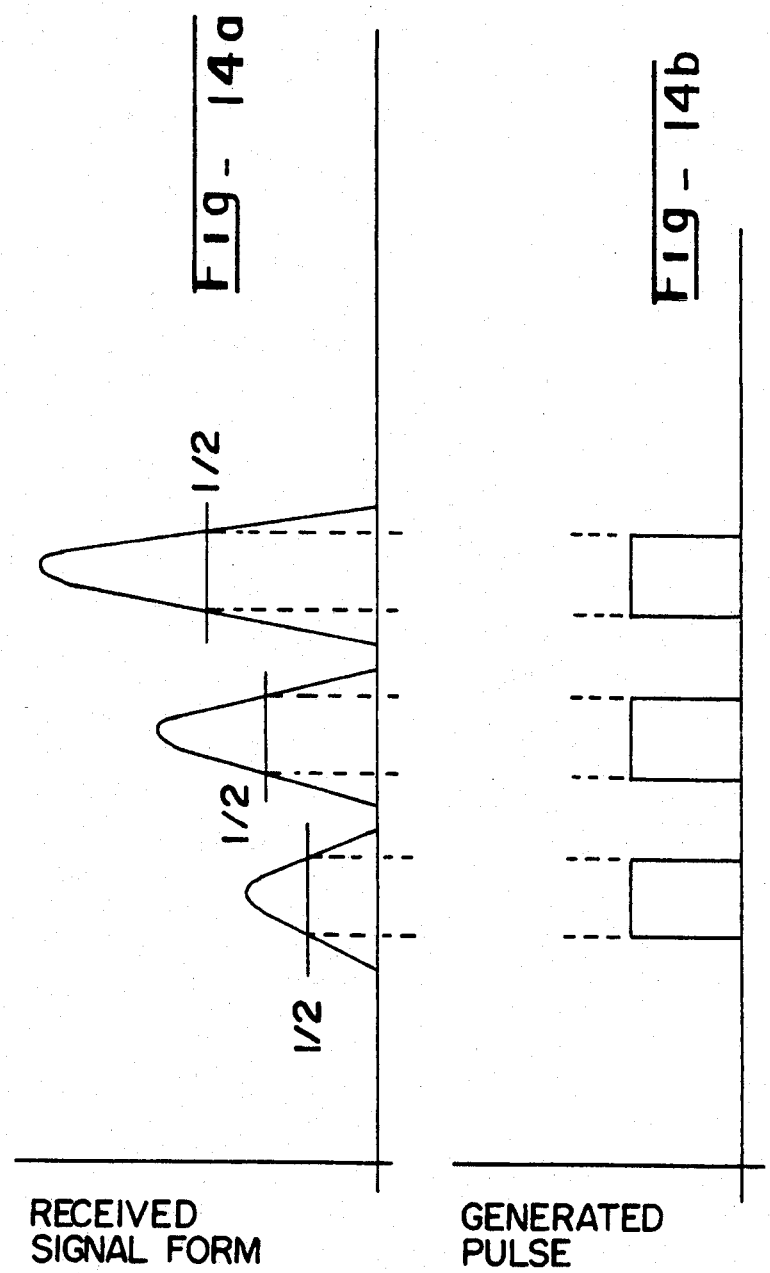

SCANNING OPTICAL SYSTEM

BACKGROUND OF THE INVENTION

1. Field of the Invention

This invention relates to a high resolution scanning optical system used for, for example, laser processing apparatus and the like, and more particularly for a scanning optical system capable of accurately correcting errors in picture-drawing due to irregularity of rotation of a scanning deflector for scanning a drawing beam, and for a scanning optical system capable of accurately detecting the position of a drawing beam deflected by a scanning deflector.

2. Description of the Prior Art

In a scanning optical system such as a laser printer, etc., a polygon mirror is generally used as a scanning deflector. The rotation of a constant angular velocity of a polygon motor used for driving the polygon mirror obtains a constancy of velocity of a drawing light spot on a drawing plane. And thus, the control of the output of drawing data is made easy.

A typical polygon mirror used for this type of use, in general, has a jitter of about 0.03%. However, as an optical system used in the conventional laser printer, etc. has about 1:50~1:70 in F number and about 60~100 μm in spot diameter, even if a polygon mirror has a jitter of the above-mentioned degree, drawing efficiency of the laser printer, etc., is hardly affected. Further if the drawing light is controlled in accordance with pulse signals from an origin detection light receiving means disposed outside of the effective scanning range, there can be obtained a sufficient drawing quality.

However, drawing laser processing apparatus require such a high degree of accuracy as 1000 dpi (dot per inch) or more in dot density and a spot diameter of a drawing light of an optical system used for it is required to be reduced to about 30 μm.

For this purpose, an optical system of about 1:25~1:35 in F number is required. In such a high accuracy apparatus as mentioned, even such minor errors caused by a jitter of the polygon mirror as mentioned above cannot be disregarded, and the jitter must be corrected.

Also, heretofore, a monitor optical system has been used in a scanning optical system. One example of such conventional scanning optical system is illustrated in FIG. 13.

This apparatus, as shown in FIG. 13, is designed such that a beam from a laser 1 is separated into a drawing beam and a monitoring beam by a half mirror 2 and then made incident to a polygon mirror 3 with different angles relative to each other, and both of the beams are simultaneously reflected and deflected by this polygon mirror 3.

The deflected respective beams are focused through an fθ lens 4. Among them, the monitoring beam is reflected by a separation mirror 5, then transmitted through a transmission scale 6, then made incident to a introducing means 7 of a scanning position detection light receiving portion, and then reaches a light receiving element 8.

On the other hand, the drawing beam reaches an image surface without passing through the separation mirror 5. In this specification, under the above-mentioned construction, a plane of deflection scanned by a scanning deflector is called a principal scanning plane, and a plane perpendicular to the principal scanning plane and further including the optical axis of the fθ lens 4 is called an auxiliary scanning plane. Since the monitoring beam is also scanned through the fθ lens 4, a monitoring spot on the transmission scale 6 scans in a constant velocity. If the transmission scale 6, etc. has a constant spatial pitch of transmission sections, it is ideal that an output signal of the same output level can be obtained from the light receiving element 8, and a pulse signal of equal pitches can be obtained from this output signal. Output pulse signals from this light receiving element 8 are used as clock pulses for correctly detecting scanning positions of the image drawing beam.

However, in the above-mentioned monitor optical system, an angle of incidence of the monitoring beam relative to the transmission scale 6 varies between a peripheral portion of the transmission scale 6 and a central portion thereof, except for a special case where the fθ lens is telecentric. As a result, the incident efficiency to the introducing means 7 is changed, and the level of the output signal of the light receiving element 8 is not constant.

Also, in case of forming the introducing means 7 by bundling optical fibers 82a (see FIG. 7) whose end portions are faced toward the transmission scale 6, empty spaces are formed among each optical fiber 82a. As the result, the following cases occur sequentially. One case is that a spot of the monitor beam passed through the transmission scale 6 makes incident wholly to the optical fiber's end portion. Another case is that the spot makes incident partially to the optical fiber's end portion and partially to the empty spaces. And in the latter case the incident ratio to the optical fiber's end portion of the spot varies according to its position on the introducing means 7. Then, the detected light quantity varies according to the quantity of incidence to the optical fiber's end portion.

Owing to the above-mentioned causes, peak values of output signals from the light receiving element 8 are changed within one trial of scanning by the monitoring beam on the transmission scale 6 as shown in FIG. 14(a).

If output pulse signals are determined as shown in FIG. 14b, by taking a threshold value at ½ of each wave height and with reference to such changing output signals, the threshold values are unstable. Moreover, the pulse widths of FIG. 14(b) become different, and correct output pulse signals become impossible to obtain.

SUMMARY OF THE INVENTION

The present invention has been accomplished in view of the above problems. It is therefore a first object of the invention to provide a scanning optical system which is capable of correcting drawing irregularities caused by irregularity of rotation of a rotary deflector such as a polygon mirror, etc., and which is suitably used for an apparatus which requires highly accurate drawing efficiency, such as a laser processing apparatus, etc.

To achieve the above object, a scanning optical system of the present invention comprises detection means for detecting a rotation of a rotary scanning deflector which causes scanning in a principal scanning plane by deflecting a drawing beam. Output timing of drawing data is then being controlled in accordance with an output signal of this detection means.

A second object of the present invention is to provide a scanning optical system including a monitor optical system capable of obtaining a correct clock pulse.

To achieve the above object, a monitor optical system of a scanning optical system according to the present invention comprises a monitor light source, a transmission scale, a scanning light receiving portion, and a diffusion plate disposed therebetween, thereby restraining irregularity of light receiving quantity of a introducing means element based on a difference in angles of incidence to the transmission scale of monitor beams.

BRIEF DESCRIPTION OF THE DRAWINGS

FIG. 2 is an enlarged view of a principal scanning plane surface of the monitor system portion in the first embodiment.

FIG. 3 is an enlarged view of an auxiliary scanning plane of the monitor system portion in the first embodiment.

FIG. 4 is an enlarged view of a monitor light source in the first embodiment.

FIG. 5 is an enlarged view of a monitor light source portion in which a small mirror of the first embodiment is not employed.

FIG. 9 is an explanatory view showing the construction of a scanning light receiving portion according to a second embodiment of the present invention.

FIG. 10 is a graph showing an output signal of a light receiving element of the scanning light receiving portion of the second embodiment.

FIGS. 11 and 12 are explanatory views for explaining the function of the diffusion plate of the second embodiment.

FIGS. 14($a$) and 14($b$) are graphs showing one example of waveforms of output signals according to the conventional monitor beam of FIG. 13.

DETAILED DESCRIPTION OF THE EMBODIMENTS

1. First Embodiment

FIGS. 1 through 8 show a first embodiment of a scanning optical system according to the present invention.

Figure 1:
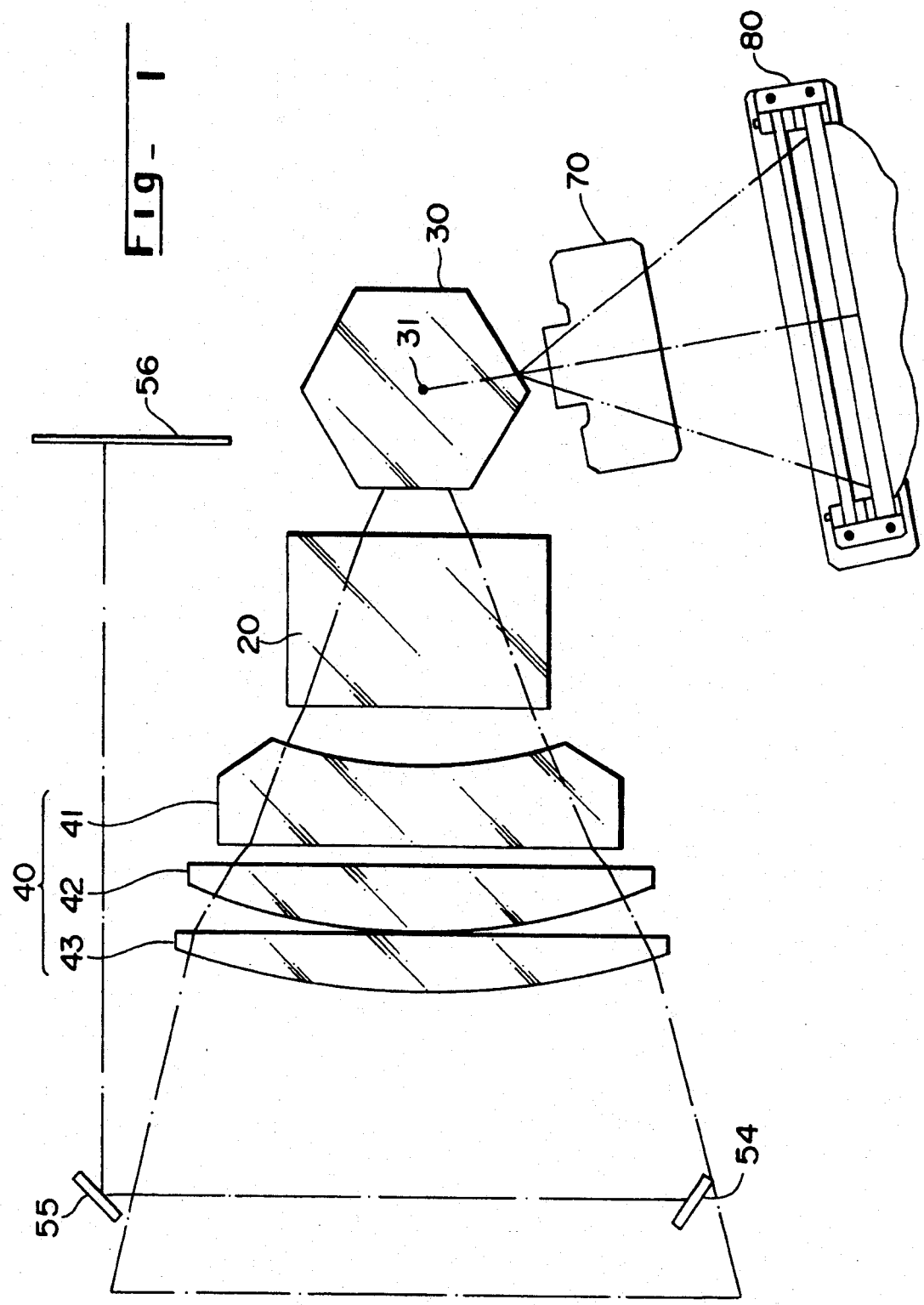
FIG. 1 is an explanatory view showing the arrangement of optical elements according to a first embodiment of the present invention.

First of all, the overall construction of the optical system will be schematically described with reference to FIG. 1.

This scanning optical system is used for, for example, laser processing apparatus, etc., in which a laser beam from a drawing light source (not shown) is deflected by a polygon mirror 30. Polygon mirror 30 acts as a scanning deflector by forming a drawing light spot which is scanned at in a constant velocity on a scanning surface (not shown) through a plane parallel plate 20 and an f$\theta$ lens 40 which acts as a scanning lens.

In general, the scanning optical system has a large positive power in the auxiliary scanning plane in order to reduce an influence caused by a tilting error of the reflecting surface of the polygon mirror 30. In this case, a focusing point of the laser beam approaches the f$\theta$ lens 40 in a peripheral portion of the scanning surface, that is, a curvature of field is formed. The plane parallel plate 20 makes the curvature of field small. In other word, the focusing position in the peripheral portion is positioned toward the scanning surface by the plane parallel plate 20.

One end portion of a drawing beam from the f$\theta$ lens 40, the beam being within the scanning range, is provided with a mirror 54. When the laser beam is reflected by the mirrors 54 and 55, this beam reaches an origin detection light receiving portion 56. Accordingly, an output pulse is obtained once per every scanning on the drawing surface of the drawing beam. This output pulse, as will be described afterwards, is utilized to signal of starting timing of drawing.

On the other hand, as detection means for detecting the rotation of the polygon mirror 30, there are employed a monitor light source portion 70 for irradiating a monitor beam to the polygon mirror 30, at a surface different from the surface of the polygon mirror 30 which reflects the drawing beam, and a monitor beam receiving portion 80 for receiving the monitor beam reflected by the polygon mirror 30.

The monitor light source portion 70, as shown in FIG. 3, includes a laser diode 71, a condenser lens unit 72 consisting of four lens groups, and a small mirror 73 for deflecting the condensed monitor beam toward the polygon mirror 30.

On the other hand, as shown in FIG. 2, the monitor beam receiving portion 80 comprises a transmission scale 81 having a pattern formed thereon, The transmittance of transmission scale 81 changes along a line to be scanned by the monitor beam. A scanning light receiving portion 82 is also provided for detecting a light quantity of the monitor beam transmitted through the transmission scale 81.

Also, the monitor light source portion 70, as shown in FIG. 2, emits a monitor light towards the rotational center axis 31 of the polygon mirror 30 in the principal scanning plane, thus canceling errors caused by change in asymmetric deflecting points of the polygon mirror 30.

However, when a beam is directed toward the rotational center axis 31 of the polygon mirror 30, the beam advances at angles in the auxiliary scanning plane as shown in FIG. 3 and therefore, the line of the monitor beam scanning on the transmission scale 81 is curved. Since the degree of curvature of the scanning line depends on an incident angle $\theta$, a small mirror 73, as shown in FIG. 4, is employed in order to keep the incident angle $\theta$ small, i.e., reflection angle, to the polygon mirror 30, so that the monitor beam is prevented from escaping from the transmission scale 81.

As is shown in FIG. 5, if the monitor beam does not miss the transmission scale 81 even when the incident angle $\theta'$ becomes large, the monitor beam may be made directly incident to the polygon mirror 30 without using the small mirror.

Figure 7:
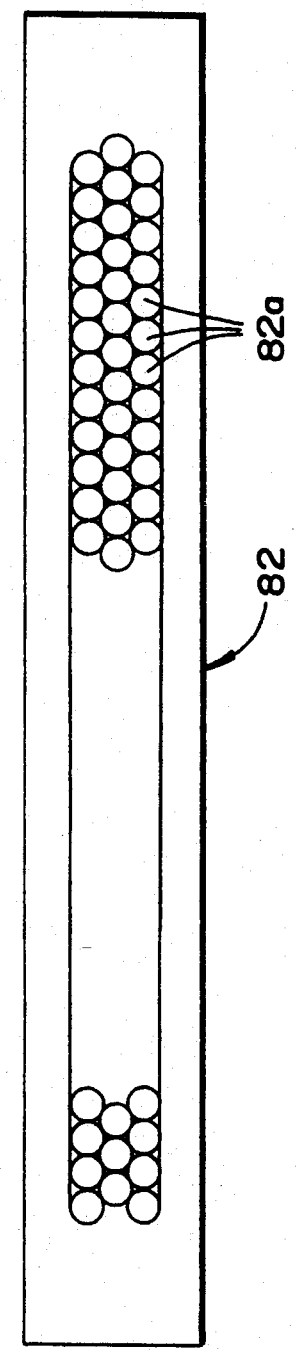
FIG. 7 is an explanatory view of an arrangement of optical fibers of a scanning light receiving portion in the first embodiment.

The scanning light receiving portion 82 includes a condensing portion formed of a plurality of optical fibers 82$a$, 82$a$, . . . (FIG. 7), with their faces faced toward the transmission scale 81 of which are arranged in multi-line as shown in FIG. 7, and light receiving elements (not shown) are disposed at the opposite end portions of these optical fibers. When the monitor beam scans across the transmission scale 81, sine waves are output from the light receiving elements.

Since the transmission scale 81 is disposed in a place upon which the monitor beam reflected by the polygon mirror 30 is directly made incident, without passing through the fθ lens, etc., a constant velocity of the light spot is not obtained on the transmission scale 81. Accordingly, the wavelength of an output wave varies when a transmission scale having a pattern of constant pitches is used.

The conventional monitor apparatus, is designed such that the monitor beam is passed through the fθ lens in order to obtain constancy of velocity. Otherwise the configuration of the transmission scale is formed in a circular arc in order to regulate the frequency of an output wave.

However, in these former constructions, where the fθ lens is used in common with both the monitoring and the drawing beam, a construction for separating the drawing beam from the monitor beam is required. In conventional constructions where the fθ lens is not used in common with both the monitoring and the drawing beam, a separate fθ lens for the exclusive use of a monitor optical system must be employed. In any case, production costs increase for such apparatus using the above mentioned conventional constructions because of an increased amount of necessary materials. Furthermore, a scale of a circular arc is difficult to make.

Figure 6:
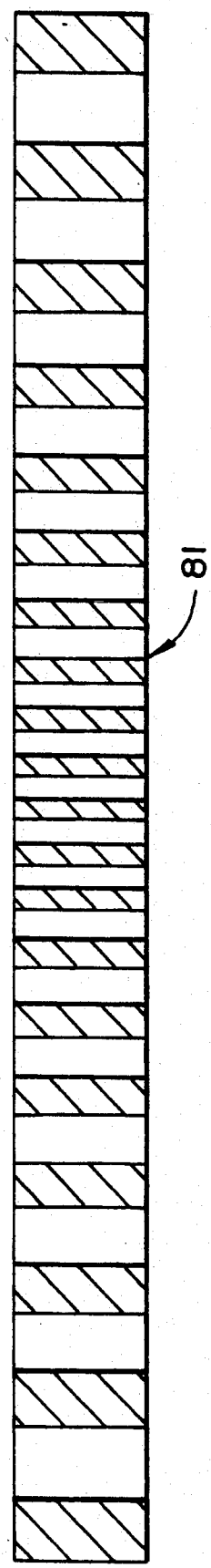
FIG. 6 is an explanatory view of a transmission scale of the first embodiment.

In view of the above, the transmission scale 81 of this embodiment has a pattern of non-constant pitches, in which spatial frequency decreases toward the peripheral portion from its central portion as schematically shown in FIG. 6. By using this pattern, even if a constant velocity of the scanning monitor beam is not obtained, the frequency of a sine wave to be output can be regulated.

In the aforementioned construction, the position of the spot on the scanning surface can be detected by detecting the rotational position of the polygon mirror. However, when the fθ lens has a error in the fθ characteristic, the output of the monitor system does not coincide with the position of the spot on the scanning surface.

Therefore, the pitches of the spatial frequency of the transmission scale 81 can be formed such that an error of the scanning position of the drawing light spot caused by error of the fθ lens can also be corrected.

Figure 8:
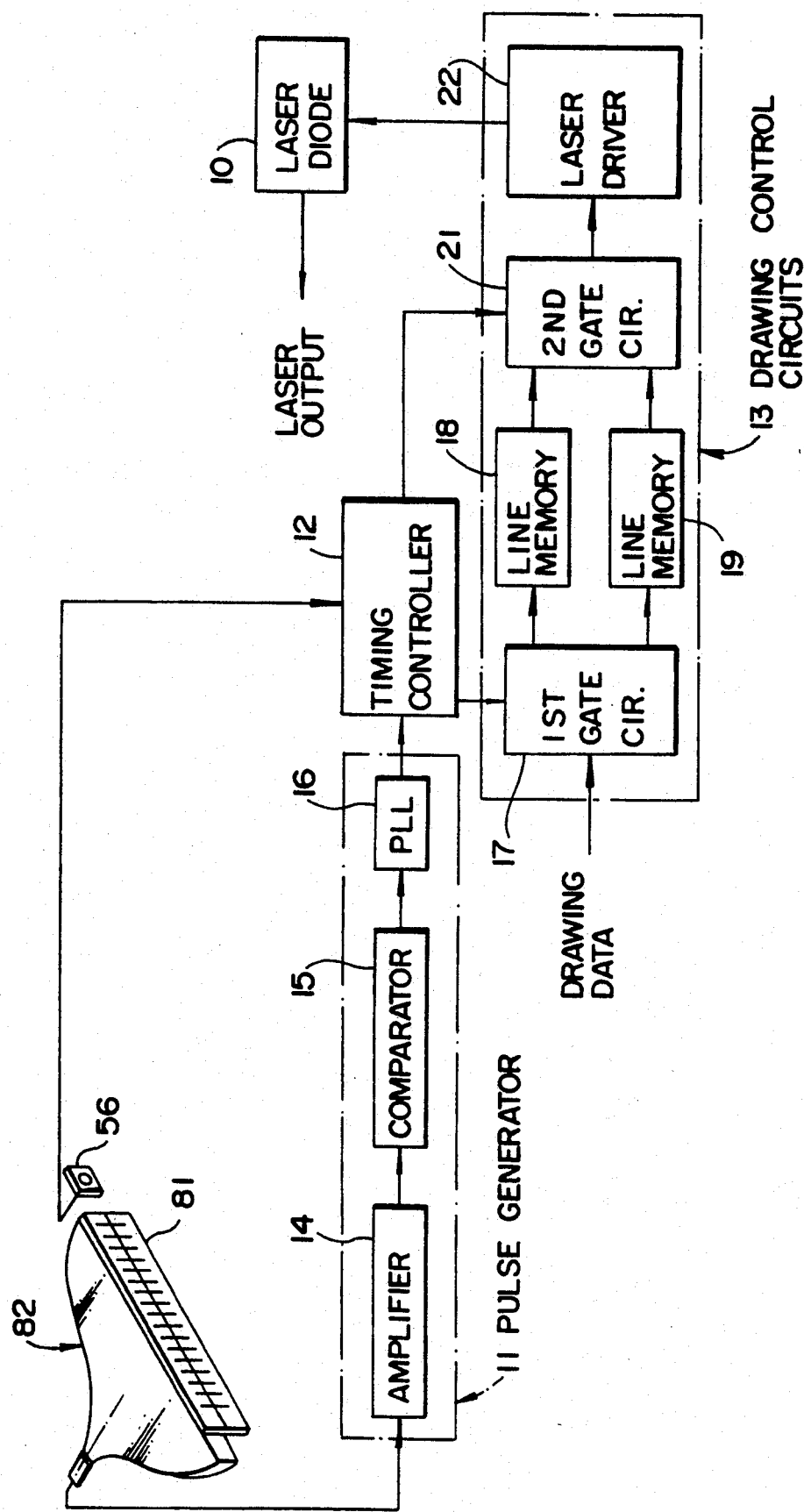
FIG. 8 is a block diagram showing a control system of the first embodiment.
Figure 13:
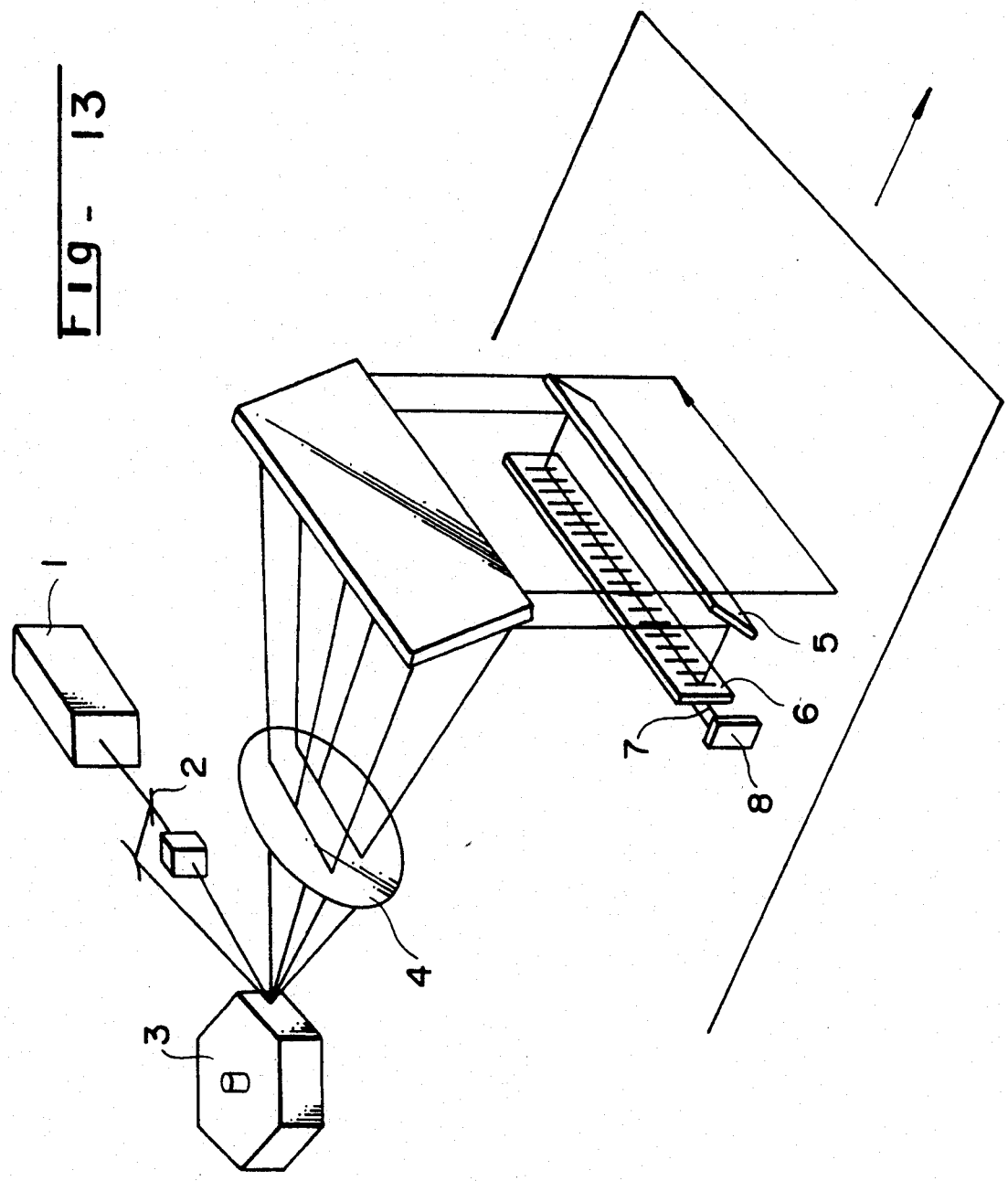
FIG. 13 is a perspective view showing one example of the construction of a conventional scanning optical system.

Next, a control system of the scanning optical system will be described with reference to FIG. 8.

This control system comprises a laser diode 10 as a drawing light source, and a pulse generator 11 into which a signal from the scanning light receiving portion 82 is input. A timing controller 12 is provided for generating, when signals from the pulse generator 11 and the origin detection light receiving portion 56 are input therein, a timing control signal for controlling a drawing data output timing, and a drawing control circuits 13 is provided for controlling the ON/OFF state of the laser diode 10 in accordance with the timing control signal and the drawing data converted to the form of raster data(serial data).

The pulse generator 11 comprises an amplifier 14, a comparator 15, and a phase-locked loop(PLL) 16, and shapes a sine wave into a rectangular wave.

The timing controller 12 feeds a timing control signal formed of a pulse signal output from the origin detection light receiving portion 56 and a clock pulse signal output from the pulse generator 11 to the drawing control circuits 13.

The drawing control circuits 13 comprises line memories 18, 19 in which the drawing data are written by one line portion in turn. A first gate circuit 17 switches to allow inputting to one of these two line memories 18, 19 in turn, and a second gate circuit 21 switches to allow outputting from one of these line memories 18, 19 in turn. A laser driver 22 ON/OFF modulates the laser diode 10 in accordance with the drawing data. The laser driver 22 also has a function of always keeping the amount of the emitted light of the laser diode 10 constant.

The first gate circuit 17 writes the raster converted drawing data in two line memories 18, 19 by one line portion in turn in accordance with the timing control signals output from the timing controller 13.

The second gate circuit 21 outputs a drawing data to the laser driver 22 while deciding a drawing start timing and a drawing end timing within one scan in a drawing surface of the drawing beam in accordance with the timing control signal from the timing controller 13.

The two line memories 18, 19 are designed such that when one data is output, the other is written, and by repeating the input and output in turn to perform drawing by one scanning line portion.

A rotary can also be used as detection means for detecting the rotation of the polygon mirror 30. However, as the rotary encoder detects an angle of rotation by dividing one rotation into a predetermined angle, it is difficult to obtain accuracy. Even if accuracy can be obtained, manufacturing cost becomes high.

On the contrary, in the monitor optical system described in the above embodiment, the rotation of the polygon mirror 30 is detected by monitoring the reflected monitoring signal as it is reflected by only one surface of the polygon mirror 30 at a time. Therefore, since the polygon mirror 30 has plural (i.e., six) reflecting surfaces, the necessary pitch of the transmission scale 81 would be less (i.e., rougher) than the pitch that would be necessary if a rotary encoder were employed. Moreover, if magnification owing to the optical system is taken into consideration, it has such advantages as that rotary detection of high accuracy can be performed by a more rough scale.

As described in the foregoing, according to a scanning optical system of the present invention, a drawing signal can be controlled by detecting irregularity of rotation of the rotary deflector and taking into consideration the effects of such irregularity of rotation.

Accordingly, there can be reproduced an image which has high reproductivity of inputting data.

Furthermore, in case a monitor optical system utilizing reflection of the polygon mirror as detection means is used, highly accurate detection can be performed at low costs by using a rotary encoder or the like.

2. Second Embodiment

The second embodiment of a scanning optical system according to the present invention will now be described. Since the overall construction of this second embodiment is the same to that of the first embodiment, description thereof will be omitted.

A scanning light receiving portion of this second embodiment will be described with reference to FIGS. 9 and 11.

Monitor beam reflected by the polygon mirror 30 is received by the monitor beam receiving portion 80

(illustrated in FIG. 1), and a signal corresponding to the scanning of the monitoring beam is output from this monitor beam receiving portion 80.

The monitor beam receiving portion 80, as shown in FIG. 9, comprises a transmission scale 81 (illustrated in FIG. 6) which is changed in transmittance along the principal scanning plane which is scanned by monitor beam. A scanning light receiving portion 82 detects light quantity of the monitor beam which has transmitted through the transmission scale 81, and a diffusion plate 83, disposed between the transmission scale 81 and the scanning light receiving portion 82, diffuses the beam which is made incident to the scanning light receiving portion 82.

A a cloudy plastic plate may, for example, be used as the diffusion plate 83. However, the invention is not limited to this, and there can be employed a plastic plate having a rough surface or a glass plate. Among them, a cloudy plastic plate is most effective. However, even when other diffusion plates are used, there can also be obtained a sufficient output signal form for generating stable pulses.

The scanning light receiving portion 82 includes a condensing portion (illustrated in FIG. 7) formed of a plurality of optical fibers 82a, 82a, . . . , with their end faces faced toward the transmission scale 81 and which are arranged in multi-line. Light receiving elements 82b are disposed in such a manner as to be opposite to a surface where the other end portions of these optical fibers 82a, 82a, . . . are gathered.

When the monitor beam scans the transmission scale 81, the beam transmitted through the transmission scale 81 is diffused by the diffusion plate 83, made incident to the optical fibers 82a, 82a, . . . , and then reaches the light receiving element 82b. A sine wave is output from the light receiving element 82b.

FIG. 10 is a graph showing output waves of the light receiving element 82b having the above construction only by peaks of the sine wave. A group of signals corresponds to one scanning on the principal scanning plane of the monitor beam. As understood from this graph, the output signal of the light receiving element 82b is held in a generally predetermined level irrespective of the position where a light spot of the monitor beam scans. In other words, the quantity of the incident light to the optical fibers 82a, 82a, . . . is equal, irreapective of the position.

Accordingly, when, for example, a voltage level of ½ of the peak value of the output signals from these light receiving elements 82b is established as a threshold value, there can be obtained pulse output signals which are constant in pulse width and stable from the pulse generator 11.

FIG. 11 shows an example which has, for the purpose of comparison, the same construction except that the diffusion plate 83 is omitted. In this case, as the monitor beam is made incident to the optical fiber 82a in a predetermined angle R in the peripheral portion of the scanning range as previously mentioned, the light quantity in the peripheral portion within an effective scanning range is decreased. The output from the light receiving element 82b becomes something like FIG. 12.

The transmission scale 81 of this embodiment has a pattern of non-constant pitches the same as that of the first embodiment.

Also, the above embodiment is designed such that the monitor light is reflected on a surface different from that on which the drawing beam of the polygon mirror 30 is reflected and then the same is received. However, the scope of the present invention is not limited to the above construction. The present invention is likewise applicable to the construction in that the laser beam from a light source is separated from a combination of a drawing beam and a monitoring beam as in the aforementioned prior art.

As described in the foregoing, according to the monitor optical system of this embodiment, as the beam transmitted through the transmission scale is diffused by a diffusion plate, the light quantity made incident to the light receiving portion can be regulated with a simple construction irrespective of its scanning position, and the pulse widths of a pulse signals output from the pulse generator can be regulated.

What is claim is:

1. A scanning optical system comprising:
   a drawing light source for generating a drawing beam;
   a rotary scanning deflector having a plurality of surfaces for deflecting said drawing beam generated from said drawing light source and scanning the same in a principal scanning plane;
   a scanning lens for focusing said drawing beam reflected by said scanning deflector onto an image surface;
   detection means for detecting a rotation of said scanning deflector wherein said detection means includes:
   (a) a monitor light source for radiating a monitor beam toward a rotational center axis of said scanning deflector and onto a surface of the scanning deflector which is different from a surface of the scanning deflector on which a drawing beam is reflected, said monitor light source being independent from said drawing light source, a mirror located between said monitor light source and said scanning deflector for deflecting a monitor beam toward said scanning deflector, wherein the monitor beam is incident on said scanning deflector at a predetermined angle in an auxiliary scanning plane;
   (b) a transmission scale having a pattern formed thereon which is changed in transmittance along a scanning line of a monitor beam reflected by said scanning deflector;
   (c) a scanning light receiving portion for detecting a light quantity of said monitor beam transmitted through said transmission scale; and
   (d) a pulse generating portion for generating a pulse train signal corresponding to rotation of said scanning deflector in accordance with said output signal from said scanning light receiving portion;
   timing control means for generating a timing control signal which controls output timing of drawing data in accordance with an output signal of said detection means; and
   drawing control means for controlling ON/OFF modulating of said drawing beam generated by said drawing light source based upon said timing control signal from said timing control means and said drawing data.

2. A scanning optical system according to claim 1, wherein said drawing light source is a laser diode.

3. A scanning optical system according to claim 1, wherein said scanning deflector is a polygon mirror.

4. A scanning optical system according to claim 1, wherein said monitor light source includes:
a light emitting element; and
a condenser lens for condensing a monitor beam emitted from said light emitting element.

5. A scanning optical system according to claim 1, wherein said monitor light source includes:
a light emitting element; and
a condenser lens for condensing a monitor beam emitted from said light emitting element.

6. A scanning optical system according to claim 1, wherein said transmission scale is disposed in a position able to directly receive a monitor beam reflected by said scanning deflector.

7. A scanning optical system according to claim 1, wherein said transmission scale includes a pattern of pitches, which is generally the same in result as that obtained when a monitor beam reflected by said scanning deflector scans on said scanning light receiving portion at a constant velocity, and wherein said transmission scale has a pattern of non-constant pitches where a spatial frequency is generally reduced as it goes toward a peripheral portion from a central portion thereof.

8. A scanning optical system according to claim 1, wherein said detection means includes a second scanning light receiving portion for outputting one pulse signal for every scan on the image surface by the drawing beam.

9. A scanning optical system according to claim 8, wherein said timing control means generates said timing control signal in accordance with a pulse signal from said second light receiving portion and a pulse train signal from said pulse generating portion.

10. A scanning optical system according to claim 1, wherein said transmission scale has a pattern of non-constant pitch where a spatial frequency is gradually reduced as it goes toward a peripheral portion from a central portion thereof.

11. A scanning optical system according to claim 1, wherein said first scanning light receiving portion comprises a plurality of optical fibers, end faces of said optical fibers faced toward said transmission scale being linearly arranged in the same direction as the scanning direction of said monitor beam.

12. A scanning optical system according to claim 11, wherein said first scanning light receiving portion comprises light receiving elements disposed in such a manner as to correspond to other end portions of said plurality of optical fiber.

13. A scanning optical system according to claim 12, wherein said first scanning light receiving portion comprises light receiving elements disposed in such a manner as to correspond to the other end portions of said plurality of optical fibers, end faces of said optical fibers faced toward said transmission scale side being linearly arranged in parallel relation in the same direction as that the scanning direction of said monitor beam.

14. A scanning optical system according to claim 1, wherein said detection means includes:
a diffusion plate disposed between said transmission scale and said scanning light receiving portion and adapted to diffuse said monitor beam made incident to said scanning light receiving portion.

15. A scanning optical system according to claim 14, wherein said diffusion plate is a cloudy plastic plate.

16. A scanning optical system according to claim 14, wherein said diffusion plate is a plastic plate or a glass plate having a rough surface.

17. A scanning optical system according to claim 1, further comprising:
a diffusion plate disposed between said transmission scale and said scanning light receiving portion and adapted to diffuse said monitor beam made incident to said scanning light receiving portion.

18. A scanning optical system according to claim 17, wherein said diffusion plate is a cloudy plastic plate.

19. A scanning optical system according to claim 17, wherein said dispersion plate is a plastic plate or a glass plate having a rough surface.

* * * * *